United States Patent
Lee et al.

(10) Patent No.: US 11,008,634 B2
(45) Date of Patent: May 18, 2021

(54) TOOL STEEL HAVING STRENGTH AND HIGH IMPACT TOUGHNESS

(71) Applicant: KOREA INSTITUTE OF INDUSTRIAL TECHNOLOGY, Cheonan-si (KR)

(72) Inventors: Min-Ha Lee, Incheon (KR); Joong-Hwan Jun, Seoul (KR); Chae-Ho Lim, Incheon (KR); Song-Yi Kim, Incheon (KR); Jin-Gu Han, Cheongju-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 187 days.

(21) Appl. No.: 16/174,780

(22) Filed: Oct. 30, 2018

(65) Prior Publication Data
US 2020/0102622 A1  Apr. 2, 2020

(30) Foreign Application Priority Data

Oct. 2, 2018 (KR) .................. 10-2018-0117535

(51) Int. Cl.
| | |
|---|---|
| *C21D 9/18* | (2006.01) |
| *C22C 38/00* | (2006.01) |
| *C21D 1/18* | (2006.01) |
| *C21D 1/32* | (2006.01) |
| *C21D 6/00* | (2006.01) |

(Continued)

(52) U.S. Cl.
CPC .............. *C21D 9/18* (2013.01); *C21D 1/18* (2013.01); *C21D 1/32* (2013.01); *C21D 6/002* (2013.01); *C21D 6/005* (2013.01); *C21D 6/008* (2013.01); *C21D 8/005* (2013.01); *C22C 38/005* (2013.01); *C22C 38/02* (2013.01); *C22C 38/04* (2013.01); *C22C 38/22* (2013.01); *C22C 38/24* (2013.01); *C22C 38/28* (2013.01); *B23D 35/001* (2013.01)

(58) Field of Classification Search
CPC .......... C21D 9/18; C21D 6/002; C21D 6/005; C21D 6/008; C21D 1/18; C21D 1/32; C21D 8/005; C22C 38/005; C22C 38/02; C22C 38/04; C22C 38/22; C22C 38/24; C22C 38/28
See application file for complete search history.

(56) References Cited

U.S. PATENT DOCUMENTS

| | | | |
|---|---|---|---|
| 8,900,382 B2 * | 12/2014 | Johansson | ............... C22C 38/54 148/334 |
| 2017/0096719 A1 * | 4/2017 | Valls Angles | ........... C22C 38/14 |
| 2020/0102622 A1 * | 4/2020 | Lee | ........................ C21D 1/32 |

FOREIGN PATENT DOCUMENTS

| | | |
|---|---|---|
| JP | 2002-167644 A | 6/2002 |
| JP | 2005226150 A | 8/2005 |

(Continued)

*Primary Examiner* — Scott R Kastler
(74) *Attorney, Agent, or Firm* — Rabin & Berdo, P.C.

(57) ABSTRACT

A tool steel having strength and high impact toughness incudes 0.7 to 0.9 wt % of C, 0.4 to 0.6 wt % of Si, 0.4 to 0.6 wt % of Mn, 7.0 to 9.0 wt % of Cr, 1.5 to 2.5 wt % of Mo, up to 1.0 wt % or less (excluding 0 wt %) of V, 0.01 to 0.06 wt % of Ce, and a remainder of Fe and inevitable impurities, wherein the tool steel has a hardness of 59 to 65 HRC and an impact toughness of 30 to 42 J/cm². The tool steel has super-high-strength combined with high impact toughness due to inclusion of Ce, thus reducing primary carbide content in an as-cast state and after solution treatment and tempering.

1 Claim, 5 Drawing Sheets

(51) Int. Cl.
*C21D 8/00* (2006.01)
*C22C 38/02* (2006.01)
*C22C 38/04* (2006.01)
*C22C 38/22* (2006.01)
*C22C 38/24* (2006.01)
*C22C 38/28* (2006.01)
*B23D 35/00* (2006.01)

(56) References Cited

FOREIGN PATENT DOCUMENTS

| | | |
|---|---|---|
| JP | 4257640 | 4/2009 |
| KR | 1020090069608 A | 7/2009 |

\* cited by examiner

TOOL STEEL HAVING STRENGTH AND HIGH IMPACT TOUGHNESS

BACKGROUND OF THE INVENTION

1. Technical Field

The present invention relates to super-high-strength tool steel having high impact toughness, and more particularly to super-high-strength tool steel having high impact toughness, in which at least one of Ti and Ce is contained, thus reducing primary carbide content in an as-cast state and exhibiting improved impact toughness at a high hardness level after solution treatment and tempering, and to a method of manufacturing the same.

2. Description of the Related Art

Upon cutting high tensile steel with an existing knife, there occur problems, such as a significant increase in production costs due to a drastic reduction in the life of the knife, deterioration in the quality of the cut surface of a cutting target (high tensile steel), failure to produce a high tensile steel sheet owing to difficulty in cutting, and the like. Hence, these problems not only cause difficulties in the steel industry but also may hinder the development of related domestic industries such as the automotive and shipbuilding industries, and furthermore, are becoming an obstacle to solving the problems of high oil prices and energy depletion worldwide. Accordingly, there is an urgent need to develop a knife for cutting steel, suitable for use in cutting high tensile steel.

In conventional tool steel, very hard primary processing carbides are formed in the segregation part of the solute element upon solidification, and large amounts of the processing carbides are dispersed and remain in the matrix even after a quenching or tempering process, whereby wear resistance may become favorable, but stress is intensively applied between the processing carbides and the matrix due to external impact and pressure, and thus the tool steel may be easily broken, which is undesirable.

Accordingly, there is the need for a composition and method for manufacturing tool steel (tool material) for super-high strength, high hardness and high toughness, having hardness of 60 HRC, impact toughness of 20 J/cm$^2$, and tensile strength of 210 kgf/mm$^2$ (2058 MPa) or more, suitable for processing industrial-based materials.

CITATION LIST

Patent Literature (Patent Document 1) Japanese Patent Application Publication No. 2002-167644
(Patent Document 2) Japanese Patent No. 4257640

SUMMARY OF THE INVENTION

Therefore, the present invention is intended to provide super-high-strength tool steel, in which at least one of Ti and Ce is contained, thus reducing primary carbide content in an as-cast state and exhibiting improved impact toughness at a high hardness level after solution treatment and tempering.

In addition, the present invention is intended to provide a method of manufacturing super-high-strength tool steel, in which impact toughness is increased at a high hardness level after solution treatment and tempering.

However, the foregoing is merely illustrative, and the technical spirit of the present invention is not limited thereto.

Therefore, the present invention provides super-high-strength tool steel having high impact toughness, comprising: 0.7 to 0.9 wt % of C, 0.4 to 0.6 wt % of Si, 0.4 to 0.6 wt % of Mn, 7.0 to 9.0 wt % of Cr, 1.5 to 2.5 wt % of Mo, 1.0 wt % or less (excluding 0 wt %) of V, and at least one of 0.1 wt % or less (excluding 0 wt %) of Ti and 0.1 wt % or less (excluding 0 wt %) of Ce, with the remainder of Fe and inevitable impurities.

In some embodiments of the present invention, the super-high-strength tool steel may include 0.1 wt % or less (excluding 0 wt %) of Ti among at least one of Ti and Ce.

In some embodiments of the present invention, the super-high-strength tool steel may include 0.005 to 0.05 wt % of Ti, and may have hardness of 59 to 65 HRC and impact toughness of 23 to 35 J/cm$^2$.

In some embodiments of the present invention, the super-high-strength tool steel may include 0.01 to 0.03 wt % of Ti and may have hardness of 59 to 65 HRC and impact toughness of 30 to 35 J/cm$^2$ at a solution temperature of 1000° C. or more.

In some embodiments of the present invention, the super-high-strength tool steel may include 0.1 wt % or less (excluding 0 wt %) of Ce among at least one of Ti and Ce.

In some embodiments of the present invention, the super-high-strength tool steel may include 0.06 wt % or less (excluding 0 wt %) of Ce, and may have hardness of 59 to 65 HRC and impact toughness of 16 to 42 J/cm$^2$.

In some embodiments of the present invention, the super-high-strength tool steel may include 0.01 to 0.06 wt % of Ce, and may have hardness of 59 to 65 HRC and impact toughness of 30 to 42 J/cm$^2$.

In addition, the present invention provides a method of manufacturing super-high-strength tool steel having high impact toughness, comprising: casting an ingot comprising 0.7 to 0.9 wt % of C, 0.4 to 0.6 wt % of Si, 0.4 to 0.6 wt % of Mn, 7.0 to 9.0 wt % of Cr, 1.5 to 2.5 wt % of Mo, 1.0 wt % or less (excluding 0 wt %) of V, and at least one of 0.1 wt % or less (excluding 0 wt %) of Ti and 0.1 wt % or less (excluding 0 wt %) of Ce, with the remainder of Fe and inevitable impurities; subjecting the ingot to homogenization at 1100 to 1200° C. and hot rolling; performing spheroidization at 850 to 900° C.; performing solution treatment including maintenance at 950 to 1100° C. and then air cooling; and performing tempering including maintenance at 480 to 570° C. and then air cooling.

In some embodiments of the present invention, the solution treatment may be performed at 1000 to 1100° C.

In some embodiments of the present invention, the tempering may be performed two or more times.

According to the present invention, super-high-strength tool steel having high impact toughness is configured to include at least one of Ti and Ce, thus reducing primary carbide content in an as-cast state and exhibiting improved impact toughness at a high hardness level after solution treatment and tempering.

Also according to the present invention, a method of manufacturing super-high-strength tool steel having high impact toughness enables the production of super-high-strength tool steel having improved impact toughness at a high hardness level.

The aforementioned effects are exemplarily described, but are not to be construed as limiting the scope of the present invention.

DESCRIPTION OF SPECIFIC EMBODIMENTS

Hereinafter, a detailed description will be given of preferred embodiments of the present invention with reference to the appended drawings. The embodiments of the present invention are provided to more fully describe the technical spirit of the present invention to those skilled in the art, and may be modified in various ways, and are not construed as limiting the present invention. Rather, these embodiments are provided to complete the present disclosure and to fully deliver the technical spirit of the present invention to those skilled in the art. As used herein, the term "and/or" may include any one of the listed items and any combination of one or more thereof. Throughout the drawings, the same reference numerals refer to the same or like parts. Furthermore, various parts and regions in the drawings are schematically depicted. Hence, the technical spirit of the present invention is not limited by the relative sizes or intervals shown in the drawings.

A Q&T (Quenching & Tempering) process is a heat treatment process for ensuring a high-strength steel material, comprising austenitization (or solution treatment), rapid cooling, and then re-heating. The solution treatment includes rapid cooling following heating to a temperature equal to or higher than an Ac3 temperature at which steel is austenitized, whereby the internal structure of steel is converted from austenite into hard martensite by means of certain diffusionless transformation. Martensite, produced through solution treatment, has very high hardness but significantly poor toughness, and thus cannot be directly used. In order to improve toughness, the tempering process is performed after solution treatment. The tempering is a decomposition precipitation process for martensite formed through diffusionless transformation, and is carried out in a manner in which carbon oversaturated in martensite is precipitated into carbides through maintenance at a predetermined temperature to thus relieve or eliminate residual stress caused by quenching, and soften a rigid microstructure. Specifically, when tempering is conducted, fine carbides precipitate in martensite, and furthermore, martensite is converted into tempered martensite.

According to the present invention, the super-high-strength tool steel having high impact toughness includes 0.7 to 0.9 wt % of C, 0.4 to 0.6 wt % of Si, 0.4 to 0.6 wt % of Mn, 7.0 to 9.0 wt % of Cr, 1.5 to 2.5 wt % of Mo, 1.0 wt % or less (excluding 0 wt %) of V, and at least one of 0.1 wt % or less (excluding 0 wt %) of Ti and 0.1 wt % or less (excluding 0 wt %) of Ce, with the remainder of Fe and inevitable impurities.

C is added in an amount of 0.7 to 0.9 wt %, and is linked with Cr, Mo and V to form primary carbides, thus increasing wear resistance. C is subjected to solid solution in a matrix upon heat treatment at a high temperature to give hard martensite. Furthermore, C is formed into carbides upon tempering at a high temperature, and may thus contribute to secondary hardening. If the amount thereof is less than 0.7 wt %, hardness and strength are low after solution treatment and tempering. On the other hand, if the amount thereof exceeds 0.9 wt %, excessive primary carbides are formed, and thus hardness is high but toughness and processability may deteriorate, which is undesirable.

Si is added in an amount of 0.4 to 0.6 wt %, and is used as a deoxidizing element. Addition thereof in an amount of 0.4 wt % or more contributes to an increase in hardness after tempering at a high temperature, but addition thereof in an amount greater than 0.6 wt % may deteriorate toughness.

Mn is added in an amount of 0.4 to 0.6 wt %, and is used as a deoxidizing element. Addition thereof in an amount of 0.4 wt % or more contributes to an increase in strength and hardenability through solid solution in a matrix. If the amount thereof exceeds 0.6 wt %, processability may deteriorate.

Cr is added in an amount of 7.0 to 9.0 wt %. Addition thereof in an amount of 7.0 wt % or more is capable of increasing hardenability through solid solution in a matrix upon solution treatment and also of forming carbides, thus increasing wear resistance. If the amount thereof exceeds 9.0 wt %, carbides may become coarse, thus deteriorating impact toughness.

Mo is added in an amount of 1.5 to 2.5 wt %. When the amount thereof is 1.5 wt % or more, quenching hardenability may increase through solid solution in a matrix upon solution treatment, softening may decrease due to tempering, and carbides may be formed, thus increasing wear resistance. If the amount thereof exceeds 2.5 wt %, toughness and processability may deteriorate.

V is added in an amount of 1.0 wt % or less to thus form stable carbides, thereby effectively preventing coarsening of crystal particles. The formation of carbides may contribute to an increase in wear resistance or hardness. If the amount thereof exceeds 1.0 wt %, processability may deteriorate.

At least one of 0.1 wt % or less (excluding 0 wt %) of Ti and 0.1 wt % or less (excluding 0 wt %) of Ce is included, and Ti is able to form fine carbides, thus considerably reducing the size of crystal particles to thereby effectively increase toughness.

In particular, among at least one of Ti and Ce, 0.1 wt % or less (excluding 0 wt %) of Ti may be contained. If the amount thereof exceeds 0.1 wt %, the amount of primary carbides not subjected to solid solution may increase, and thus toughness may deteriorate.

Preferably, Ti is contained in an amount of 0.005 to 0.05 wt %, thus exhibiting hardness of 59 to 65 HRC and impact toughness of 23 to 35 J/cm$^2$. More preferably, the tool steel of the invention includes 0.01 to 0.03 wt % of Ti and has hardness of 59 to 65 HRC and impact toughness of 30 to 35 J/cm$^2$ at a solution temperature of 1000° C. or more.

Ce functions to reduce the amount of oxygen in a matrix and the amount and size of primary carbides and is thus effective at increasing impact toughness.

In particular, among at least one of Ti and Ce, Ce may be contained in an amount of 0.1 wt % or less (excluding 0 wt %). If the amount thereof exceeds 0.1 wt %, the amount of primary carbides not subjected to solid solution may increase, and thus toughness may deteriorate.

Preferably, Ce is contained in an amount of 0.06 wt % or less, and hardness of 59 to 65 HRC and impact toughness of 16 to 42 J/cm$^2$ are exhibited. More preferably, Ce is selected and is contained in an amount of 0.01 to 0.06 wt %, and hardness of 59 to 65 HRC and impact toughness of 30 to 42 J/cm$^2$ are exhibited.

According to the present invention, the super-high-strength tool steel having high impact toughness is designed to contain C and Cr in amounts less than those of commercially available SKD11 steel grade such that the formation of primary carbides is maximally inhibited during solidification and insufficient properties are supplemented by the addition of Mo and V. The tool steel of the present invention shows a very high data value of −181 based on the results of analysis of thermodynamic simulation data (ΔT), thereby exhibiting superior strength and impact toughness.

As described above, the super-high-strength tool steel having high impact toughness includes Ti and Ce to thus reduce primary carbide content in an as-cast state, whereby the rolled material subjected to final solution treatment and tempering manifests improved impact toughness under the same heat treatment conditions or at the same hardness level. The formation of coarse primary carbides (primary carbides formed in an as-cast state, mainly M7C3) is inhibited, thus increasing toughness, and hard fine carbides (M7C3, M23C6, etc., mainly M23C6) are precipitated upon tempering, thereby increasing hardness.

In particular, the super-high-strength tool steel having high impact toughness includes Ti and Ce, and thus the hardness thereof is slightly decreased but the primary carbide (M7C3) volume fraction is lowered, and thereby impact toughness may be enhanced compared to steel free of Ti and Ce.

Figure 1:
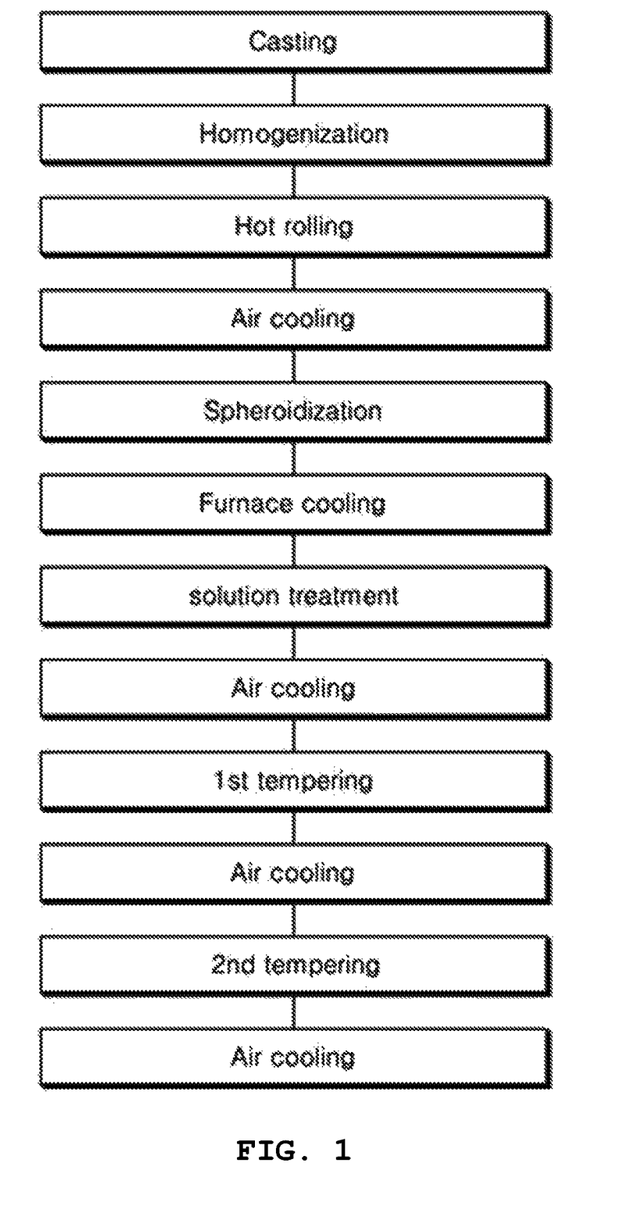
FIG. 1 is a flowchart showing a heat treatment process applied to super-high-strength tool steel having high impact toughness according to an embodiment of the present invention.

FIG. 1 is a flowchart showing the sequence of heat treatment of super-high-strength tool steel having high impact toughness according to an embodiment of the present invention. The method of manufacturing super-high-strength tool steel having high impact toughness according to the present invention includes the steps of casting, homogenization, hot rolling, spheroidization, solution treatment and tempering.

In the casting step, an ingot, comprising 0.7 to 0.9 wt % of C, 0.4 to 0.6 wt % of Si, 0.4 to 0.6 wt % of Mn, 7.0 to 9.0 wt % of Cr, 1.5 to 2.5 wt % of Mo, 1.0 wt % or less (excluding 0 wt %) of V, and at least one of 0.1 wt % or less (excluding 0 wt %) of Ti and 0.1 wt % or less (excluding 0 wt %) of Ce, with the remainder of Fe and inevitable impurities, is cast.

The alloying elements, such as Fe, C, Cr, Mo, and V, having high purity, were weighed so as to be suitable for a desired composition, dissolved in a vacuum and then cast in a mold in the air.

The ingot thus produced had a size of 14 (T)×70 (W)×120 (H) mm$^3$. In order to prepare a rolling material for use in test specimens for evaluating a microstructure and mechanical properties, the ingot was cut into a square bar having a thickness of about 20 mm.

Figure 2:
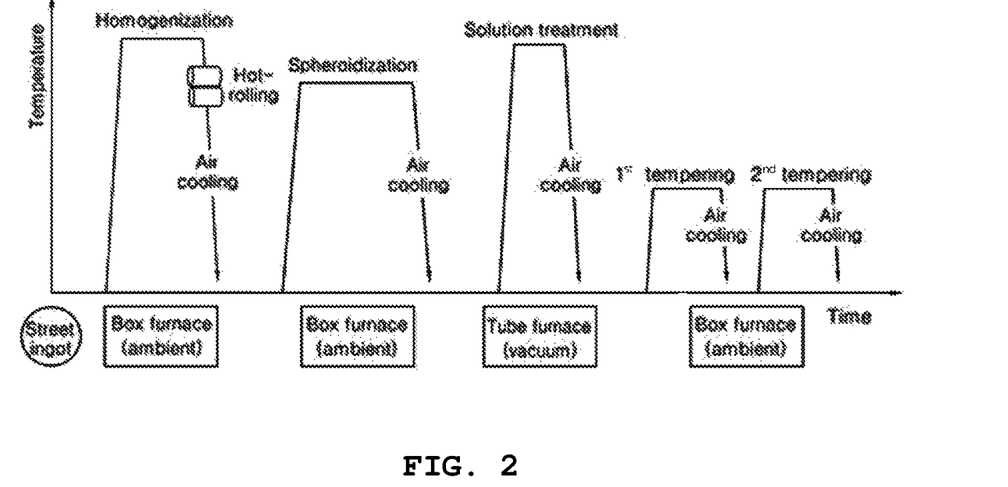
FIG. 2 is a graph showing the heat treatment temperature and time of the super-high-strength tool steel having high impact toughness according to an embodiment of the present invention.

FIG. 2 is a graph showing the heat treatment temperature and time of the super-high-strength tool steel having high impact toughness according to an embodiment of the present invention.

In the homogenization step, the ingot is homogenized at 1100 to 1200° C. When the homogenization temperature is controlled in the range of 1100° C. to 1200° C., coarse carbides may be subjected to solid solution so that carbide components may be dispersed in the matrix to thus improve the carbide distribution. In an embodiment, the cut square bar was homogenized at 1150° C. for 1 hr.

In the hot rolling step, hot rolling is performed. Here, the hot rolling was conducted at about 90% for producing a test specimen for observing a microstructure and a tensile test specimen, and at about 50% for producing hardness and impact test specimens.

The spheroidization step is performed at 850 to 900° C. to facilitate processing of a test specimen by decreasing hardness. The spheroidization heat treatment may be carried out at 870° C. for 4 hr.

From the material subjected to spheroidization heat treatment, (i) a planar tensile test specimen having an ASTM-E8 subsize with a gauge length of 25 mm, (ii) a C-notched impact test specimen having a size of 10×10×55 mm$^3$ with a radius of curvature of 10R, (iii) a hardness test specimen and (iv) a test specimen for observing a microstructure were prepared through mechanical processing.

The solution treatment step is performed through maintenance at 950 to 1100° C. and then air cooling. All test specimens were maintained at 986° C., 1036° C. and 1086° C. for 30 min and then air cooled. In particular, the tool steel subjected to solution treatment at 1000 to 1100° C. may have superior hardness and improved impact toughness.

The tempering step is performed through maintenance at 480 to 570° C. and then air cooling. The tempering step may be repeated two or more times. Tempering treatment including maintenance at 500° C. and 550° C. for 2 hr and then air cooling was repeated two times. When the tempering temperature is 480° C. or more, residual stress upon solution treatment is removed and thus a stable structure may be formed, and simultaneously, secondary hardening effects may be obtained through precipitation hardening of MC carbides of Mo, V and the like, thus ensuring superior hardness. If the tempering temperature is excessively elevated to 570° C. or more, MC carbides may become more coarse and unstable, which is undesirable.

The tensile test was performed at room temperature at a speed of 1×10$^{-3}$/s, hardness was measured on a Rockwell C-scale, and the impact test was performed at room temperature through a Charpy impact method.

A better understanding of the details of the present invention will be given through the following examples and test examples.

The compositions of super-high-strength tool steel having high impact toughness according to an embodiment of the present invention are shown in Table 1 below. As shown in Table 1, alloying elements such as Fe, C, Cr, Mo, and V having high purity were weighed so as to be suitable for a desired composition, dissolved in a vacuum and then cast in a mold in the air.

TABLE 1

| | Steel grade | C (Wt %) | Si (Wt %) | Mn (Wt %) | Cr (Wt %) | Mo (Wt %) | V (Wt %) | Ti (Wt %) | Ce (Wt %) |
|---|---|---|---|---|---|---|---|---|---|
| A-1 | K73 | 0.800 | 0.500 | 0.470 | 7.960 | 2.020 | 0.510 | 0 | 0 |
| A-2 | K73 | 0.800 | 0.500 | 0.470 | 7.960 | 2.020 | 0.510 | 0 | 0 |
| A-3 | K73 | 0.800 | 0.500 | 0.470 | 7.960 | 2.020 | 0.510 | 0 | 0 |
| B1-1 | K73_Ti | 0.800 | 0.510 | 0.470 | 7.900 | 2.000 | 0.510 | 0.017 | 0 |
| B1-2 | K73_Ti | 0.800 | 0.510 | 0.470 | 7.900 | 2.000 | 0.510 | 0.017 | 0 |
| B1-3 | K73_Ti | 0.800 | 0.510 | 0.470 | 7.900 | 2.000 | 0.510 | 0.017 | 0 |
| B2-1 | K73_Ti_M | 0.800 | 0.470 | 0.440 | 7.880 | 1.960 | 0.490 | 0.039 | 0 |
| B2-2 | K73_Ti_M | 0.800 | 0.470 | 0.440 | 7.880 | 1.960 | 0.490 | 0.039 | 0 |
| B2-3 | K73_Ti_M | 0.800 | 0.470 | 0.440 | 7.880 | 1.960 | 0.490 | 0.039 | 0 |
| C1-1 | K73_Ce | 0.800 | 0.500 | 0.470 | 7.860 | 1.990 | 0.500 | 0 | 0.019 |
| C1-2 | K73_Ce | 0.800 | 0.500 | 0.470 | 7.860 | 1.990 | 0.500 | 0 | 0.019 |
| C1-3 | K73_Ce | 0.800 | 0.500 | 0.470 | 7.860 | 1.990 | 0.500 | 0 | 0.019 |
| C2-1 | K73_Ce_M | 0.800 | 0.470 | 0.460 | 7.940 | 2.000 | 0.500 | 0 | 0.039 |
| C2-2 | K73_Ce_M | 0.800 | 0.470 | 0.460 | 7.940 | 2.000 | 0.500 | 0 | 0.039 |
| C2-3 | K73_Ce_M | 0.800 | 0.470 | 0.460 | 7.940 | 2.000 | 0.500 | 0 | 0.039 |
| C2-4 | K73_Ce_M | 0.800 | 0.470 | 0.460 | 7.940 | 2.000 | 0.500 | 0 | 0.039 |
| C2-5 | K73_Ce_M | 0.800 | 0.470 | 0.460 | 7.940 | 2.000 | 0.500 | 0 | 0.039 |
| D1-1 | K73_TiCe | 0.800 | 0.500 | 0.470 | 7.980 | 2.010 | 0.500 | 0.030 | 0.019 |
| D1-2 | K73_TiCe | 0.800 | 0.500 | 0.470 | 7.980 | 2.010 | 0.500 | 0.030 | 0.019 |
| D1-3 | K73_TiCe | 0.800 | 0.500 | 0.470 | 7.980 | 2.010 | 0.500 | 0.030 | 0.019 |
| D2-1 | K73_TiCe_M | 0.800 | 0.480 | 0.460 | 7.910 | 1.980 | 0.500 | 0.038 | 0.045 |
| D2-2 | K73_TiCe_M | 0.800 | 0.480 | 0.460 | 7.910 | 1.980 | 0.500 | 0.038 | 0.045 |
| D2-3 | K73_TiCe_M | 0.800 | 0.480 | 0.460 | 7.910 | 1.980 | 0.500 | 0.038 | 0.045 |
| E1 | K1 | 0.550 | 1.000 | 0.350 | 5.000 | 1.000 | 1.000 | 0 | 0 |
| E2 | K3 | 0.600 | 1.500 | 0.400 | 4.500 | 2.500 | 1.500 | 0 | 0 |
| E3 | K5 | 0.800 | 0.600 | 0.600 | 6.000 | 2.500 | 1.000 | 0 | 0 |
| E4 | K11 | 0.850 | 0.500 | 0.400 | 5.500 | 2.500 | 1.000 | 0 | 0 |
| E5 | SKD11 | 1.500 | 0.400 | 0.600 | 12.00 | 1.200 | 0.350 | 0 | 0 |

The measured values of solution temperature (° C.), tempering temperature (° C.), yield strength (MPa), tensile strength (MPa), elongation (%), and hardness (HRC) depending on the composition of the tool steel according to an embodiment of the present invention are shown in Table 2 below.

TABLE 2

| | Steel grade | Q/T conditions Solution Temp. (° C.) | Tempering Temp. (° C.) | Yield strength (MPa) | Tensile strength (MPa) | Elongation (%) | Hardness (HRC) |
|---|---|---|---|---|---|---|---|
| A-1 | K73 | 1036 | 500 | 1980 | 2551 | 3.3 | 62.1 |
| A-2 | K73 | 1086 | 500 | 1972 | 2446 | 3.9 | 64.4 |
| A-3 | K73 | 1086 | 550 | 1957 | 2259 | 5.1 | 59.5 |
| B1-1 | K73_Ti | 986 | 500 | 1886 | 2291 | 3.7 | 59.6 |
| B1-2 | K73_Ti | 1036 | 500 | 2063 | 2587 | 5.7 | 63.5 |
| B1-3 | K73_Ti | 1086 | 550 | 1987 | 2257 | 4.9 | 59.6 |
| B2-1 | K73_Ti_M | 986 | 500 | 1863 | 2305 | 6.4 | 60.2 |
| B2-2 | K73_Ti_M | 1036 | 500 | 2019 | 2560 | 6.5 | 62.9 |
| B2-3 | K73_Ti_M | 1086 | 500 | 1893 | 2338 | 4.2 | 64.1 |
| C1-1 | K73_Ce | 986 | 500 | 1851 | 2274 | 5.0 | 60.1 |
| C1-2 | K73_Ce | 1036 | 500 | 2007 | 2609 | 7.9 | 62.1 |
| C1-3 | K73_Ce | 1086 | 550 | 1932 | 2255 | 6.1 | 59.4 |
| C2-1 | K73_Ce_M | 986 | 500 | 1852 | 2267 | 6.0 | 59.7 |
| C2-2 | K73_Ce_M | 1036 | 500 | 2046 | 2507 | 3.8 | 62.9 |
| C2-3 | K73_Ce_M | 1036 | 550 | 1810 | 2467 | 3.4 | 62.0 |
| C2-4 | K73_Ce_M | 1086 | 500 | 1742 | 2183 | 4.1 | 64.4 |
| C2-5 | K73_Ce_M | 1086 | 550 | 1999 | 2288 | 5.8 | 59.8 |
| D1-1 | K73_TiCe | 986 | 500 | 1850 | 2314 | 7.4 | 59.3 |
| D1-2 | K73_TiCe | 1036 | 500 | 2085 | 2469 | 3.7 | 62.0 |
| D1-3 | K73_TiCe | 1086 | 550 | 1957 | 2245 | 5.9 | 58.5 |
| D2-1 | K73_TiCe_M | 986 | 500 | 1852 | 2246 | 5.6 | 59.9 |
| D2-2 | K73_TiCe_M | 1036 | 500 | 2066 | 2361 | 3.0 | 62.8 |
| D2-3 | K73_TiCe_M | 1086 | 550 | 2002 | 2291 | 4.9 | 59.9 |
| E1 | K1 | 1030 | 520 | 1526 | 1823 | 8.2 | 53.0 |
| E2 | K3 | 1030 | 520 | 1688 | 1834 | 1.6 | 54.7 |
| E3 | K5 | 1030 | 520 | 1601 | 2054 | 6.6 | 55.0 |
| E4 | K11 | 1030 | 520 | 1645 | 1962 | 4.9 | 52.0 |
| E5 | SKD11 | 1030 | 520 | 1620 | 1850 | 2.3 | 60.0 |

The measured values of hardness (HRC) and impact toughness (J/cm²) depending on the composition of the tool steel according to an embodiment of the present invention are shown in Table 3 below.

TABLE 3

|  | Steel grade | Hardness (HRC) | Impact toughness (J/cm²) |
|---|---|---|---|
| A-1 | K73 | 62.1 | 8.2 |
| A-2 | K73 | 64.4 | 13.7 |
| A-3 | K73 | 59.5 | 24.1 |
| B1-1 | K73_Ti | 59.6 | 24.2 |
| B1-2 | K73_Ti | 63.5 | 30.7 |
| B1-3 | K73_Ti | 59.6 | 34.1 |
| B2-2 | K73_Ti_M | 62.9 | 25.6 |
| B2-3 | K73_Ti_M | 64.1 | 23.7 |
| C1-3 | K73_Ce | 59.4 | 34.1 |
| C2-2 | K73_Ce_M | 62.9 | 30.5 |
| C2-3 | K73_Ce_M | 62.0 | 41.0 |
| C2-4 | K73_Ce_M | 64.4 | 31.0 |
| C2-5 | K73_Ce_M | 59.8 | 39.4 |
| D1-1 | K73_TiCe | 59.3 | 25.7 |
| D1-2 | K73_TiCe | 62.0 | 24.4 |
| D1-3 | K73_TiCe | 58.5 | 16.0 |
| D2-1 | K73_TiCe_M | 59.9 | 28.2 |
| D2-2 | K73_TiCe_M | 62.8 | 23.2 |
| D2-3 | K73_TiCe_M | 59.9 | 17.7 |
| E1 | K1 | 53.0 | 66.0 |
| E2 | K3 | 54.7 | 26.4 |
| E3 | K5 | 55.0 | 23.0 |
| E4 | K11 | 52.0 | 26.0 |
| E5 | SKD11 | 60.0 | 13.0 |

The tool steel according to the present invention may include 0.7 to 0.9 wt % of C, 0.4 to 0.6 wt % of Si, 0.4 to 0.6 wt % of Mn, 7.0 to 9.0 wt % of Cr, 1.5 to 2.5 wt % of Mo, 1.0 wt % or less (excluding 0 wt %) of V, and at least one of 0.1 wt % or less (excluding 0 wt %) of Ti and 0.1 wt % or less (excluding 0 wt %) of Ce, with the remainder of Fe and inevitable impurities. The tool steel according to the present invention may include 0.1 wt % or less (excluding 0 wt %) of Ti among at least one of Ti and Ce, and particularly 0.005 to 0.05 wt % of Ti, and may have hardness of 59 to 65 HRC and impact toughness of 23 to 35 J/cm².

The effects of improvement of hardness, tensile strength and impact toughness of the tool steel according to an embodiment of the present invention due to the addition of Cr are evaluated. As is apparent from Tables 2 and 3, Examples E1 to E5, in which the amount of Cr falls out of the range of the present invention, do not exhibit the hardness, tensile strength or impact toughness desired in the present invention. E1 to E4 manifest low hardness and tensile strength due to the lack of Cr, and E5 shows low impact toughness due to an excess of Cr.

The effects of improvement of impact toughness of the tool steel according to an embodiment of the present invention due to the addition of Ti are evaluated through Examples under conditions of a solution temperature of 1036° C. and a tempering temperature of 500° C. in Table 3. Specifically, impact toughness was measured to be 8.2 J/cm² in A-1 including 0 wt % of Ti, 30.7 J/cm² in B1-2 including 0.019 wt % of Ti, and 25.6 J/cm² in B2-2 including 0.039 wt % of Ti, indicating that impact toughness was maximized at about 0.02 wt % of Ti. However, as for tensile strength depending on the amount of Ti as shown in Table 2, tensile strength was measured to be 2551 MPa in A-1 including 0 wt % of Ti, 2587 MPa in B1-2 including 0.019 wt % of Ti, and 2560 MPa in B2-2 including 0.039 wt % of Ti, indicating that there were almost no significant differences.

The effects of improvement of impact toughness of the tool steel according to an embodiment of the present invention due to the addition of Ce are evaluated through Examples under conditions of a solution temperature of 1086° C. and a tempering temperature of 550° C. Specifically, impact toughness was measured to be 24.1 J/cm² in A-3 including 0 wt % of Ce, 34.1 J/cm² in C1-3 including 0.019 wt % of Ce, and 39.4 J/cm² in C2-5 including 0.039 wt % of Ce, indicating that impact toughness was increased with an increase in the amount of Ce. When the amount of Ce is 0.019 wt % or more, impact toughness greater than 30 J/cm² may be obtained, which is regarded as superior. As is apparent from Table 2, in Examples under conditions of a solution temperature of 1036° C. and a tempering temperature of 500° C., tensile strength was measured to be 2551 MPa in A-1 including 0 wt % of Ce, 2609 MPa in C1-2 including 0.019 wt % of Ce, and 2507 MPa in C2-2 including 0.039 wt % of Ce, indicating that tensile strength was relatively high at 0.019 wt % of Ce but the measured values were not significantly different from each other.

The effects of improvement of impact toughness of the Ti-added steel according to an embodiment of the present invention depending on the solution temperature are evaluated. Specifically, the impact toughness of the 0.039 wt % Ti-added steel (K73_Ti_M) was measured to be 25.6 J/cm² at 1036° C. in B2-2, and 23.7 J/cm² at 1086° C. in B2-3, indicating that impact toughness varied depending on the solution treatment temperature (quenching temperature) and was maximized at 1036° C.

For the effects of improvement of tensile strength of the Ti-added steel depending on the solution temperature, the tensile strength of the 0.039 wt % Ti-added steel (K73_Ti_M) was measured to be 2305 MPa at 986° C. in B2-1, 2560 MPa at 1036° C. in B2-2, and 2338 MPa at 1086° C. in B2-3, indicating that the tensile strength varied depending on the solution treatment temperature and was maximized at 1036° C.

Therefore, the impact toughness and tensile strength of the 0.039 wt % Ti-added steel (K73_Ti_M) vary depending on the solution temperature and are maximized at 1036° C.

The effects of improvement of impact toughness of the Ce-added steel according to an embodiment of the present invention depending on the solution temperature are evaluated. Specifically, the impact toughness of the 0.039 wt % Ce-added steel (K73_Ce_M) was measured to be 30.5 J/cm² at 1036° C. in C2-2 and 31.0 J/cm² at 1086° C. in C2-4, indicating that impact toughness was increased with an elevation in the solution treatment temperature.

Also, the effects of improvement of tensile strength of the Ce-added steel depending on the solution temperature are evaluated. Specifically, the tensile strength of the 0.019 wt % Ce-added steel (K73_Ce) was measured to be 2274 MPa at 986° C. in C1-1, 2609 MPa at 1036° C. in C1-2, and 2255 MPa at 1086° C. in C1-3, indicating that the tensile strength was increased and then decreased with an elevation in the solution temperature, and was maximized at 1036° C.

The tensile strength of the 0.039 wt % Ce-added steel (K73_Ce_M) was measured to be 2267 MPa at 986° C. in C2-1, 2507 MPa at 1036° C. in C2-2, and 2183 MPa at 1086° C. in C2-4, indicating that the tensile strength varied depending on the solution treatment temperature and was maximized at 1036° C., like the 0.019 wt % Ce-added steel.

The tool steel according to the present invention may include 0.7 to 0.9 wt % of C, 0.4 to 0.6 wt % of Si, 0.4 to 0.6 wt % of Mn, 7.0 to 9.0 wt % of Cr, 1.5 to 2.5 wt % of Mo, 1.0 wt % or less (excluding 0 wt %) of V, and at least one of 0.1 wt % or less (excluding 0 wt %) of Ti and 0.1 wt % or less (excluding 0 wt %) of Ce, with the remainder of Fe and inevitable impurities.

As is apparent from Tables 2 and 3, among at least one of Ti and Ce, Ti may be contained in an amount of 0.1 wt % or less (excluding 0 wt %). The tool steel of the invention may include 0.005 to 0.05 wt % of Ti, and may exhibit hardness of 59 to 65 HRC and impact toughness of 23 to 35 J/cm². In particular, Ti is selected and contained in an amount of 0.01 to 0.03 wt %, and hardness of 59 to 65 HRC and impact toughness of 30 to 35 J/cm² may be exhibited at a solution temperature of 1000° C. or more. As is apparent from Tables 2 and 3, among at least one of Ti and Ce, Ce may be contained in an amount of 0.1 wt % or less (excluding 0 wt %). The tool steel of the invention may include 0.06 wt % or less (excluding 0 wt %) of Ce, and may exhibit hardness of 59 to 65 HRC and impact toughness of 16 to 42 J/cm². In particular, Ce is selected and contained in an amount of 0.01 to 0.06 wt %, and hardness of 59 to 65 HRC and impact toughness of 30 to 42 J/cm² may be exhibited.

Figure 3:
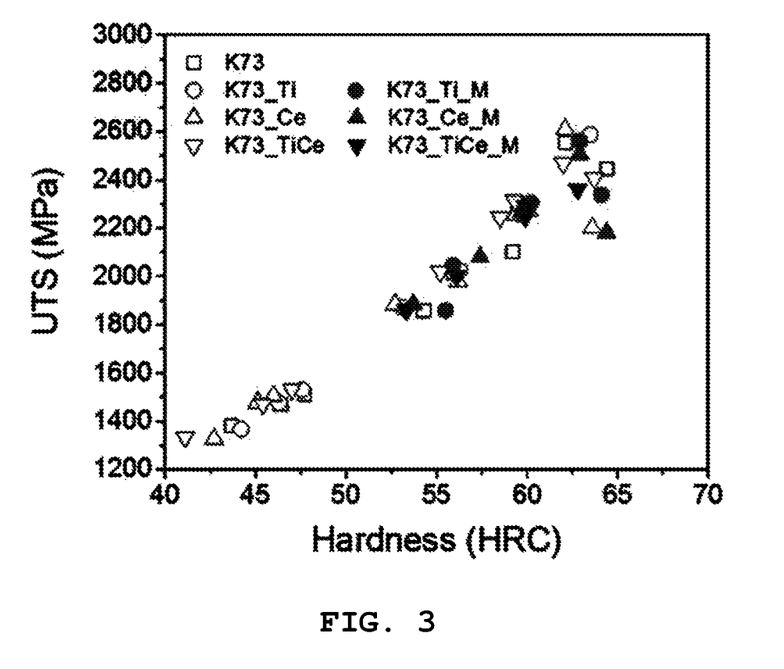
FIG. 3 is a graph showing tensile strength (UTS) depending on the hardness of the tool steel manufactured according to an embodiment of the present invention.

FIG. 3 is a graph showing the tensile strength (UTS) depending on the hardness of the tool steel manufactured according to an embodiment of the present invention. The tensile strength has the following relationship with hardness of the tool steel, and there is almost no significant difference in the measured tensile strength due to Ti addition or Ce addition.

$$\text{Tensile strength(total)} = -1{,}017.8 + 54.5 \times \text{hardness}$$

In the above relationship, tensile strength is represented as MPa, and hardness is represented as HRC.

Figure 4:
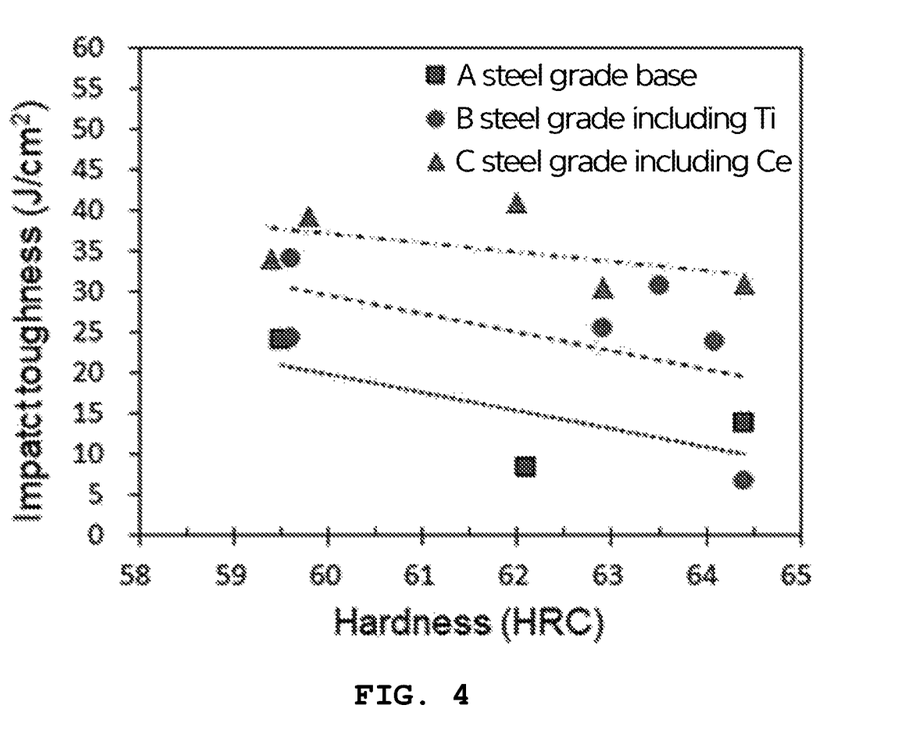
FIG. 4 is a graph showing impact toughness depending on the hardness of the tool steel manufactured according to an embodiment of the present invention.

FIG. 4 is a graph showing the impact toughness depending on the hardness of the tool steel manufactured according to an embodiment of the present invention. The impact toughness depending on the hardness has the following relationship.

$$\text{Impact toughness(total)} = 69.4 - 0.759 \times \text{hardness}$$

In the above relationship, impact toughness is represented as J/cm², and hardness is represented as HRC.

In the present invention, the impact toughness depending on the hardness shows different tendencies depending on whether or not Ti or Ce is contained. The steel grade (A) that contains neither Ti nor Ce has the following relationship of impact toughness depending on hardness.

$$\text{Impact toughness(A steel grade)} = 152.28 - 2.21 \times \text{hardness}$$

On the other hand, Ti-added steel and Ce-added steel have the following relationships.

Relationship 1: $\text{Impact toughness}(B \text{ steel grade}) = 168.86 - 2.32 \times \text{hardness}$ Relationship 2: $\text{Impact toughness}(C \text{ steel grade}) = 107.24 - 1.17 \times \text{hardness}$ The slopes of the Ti-added steel and the Ce-added steel, which indicate the correlation of impact toughness with hardness, are different, but impact toughness is improved at the same hardness. In the Ti-added steel (B steel grade), compared to base K73 steel (A steel grade), impact toughness was improved by about 10 J/cm² at the same hardness, and in the Ce-added steel (C steel grade), compared to base K73 steel (A steel grade), impact toughness was improved by about 17 to 23 J/cm² at the same hardness. In the Ce-added steel (C steel grade) compared to the Ti-added steel (B steel grade), impact toughness was improved by about 7 to 13 J/cm² at the same hardness, and the impact toughness improvement effect was greater at high hardness.

Compared to the Ti-added steel, the Ce-added steel was further improved in impact toughness at the same hardness level, and moreover, superior properties are manifested in tool steel made of Ce alone compared to the steel made of both Ti and Ce. It is understood that the same effect as in the Ce-added tool steel cannot be obtained even when any component is selected among REM.

Figure 5:
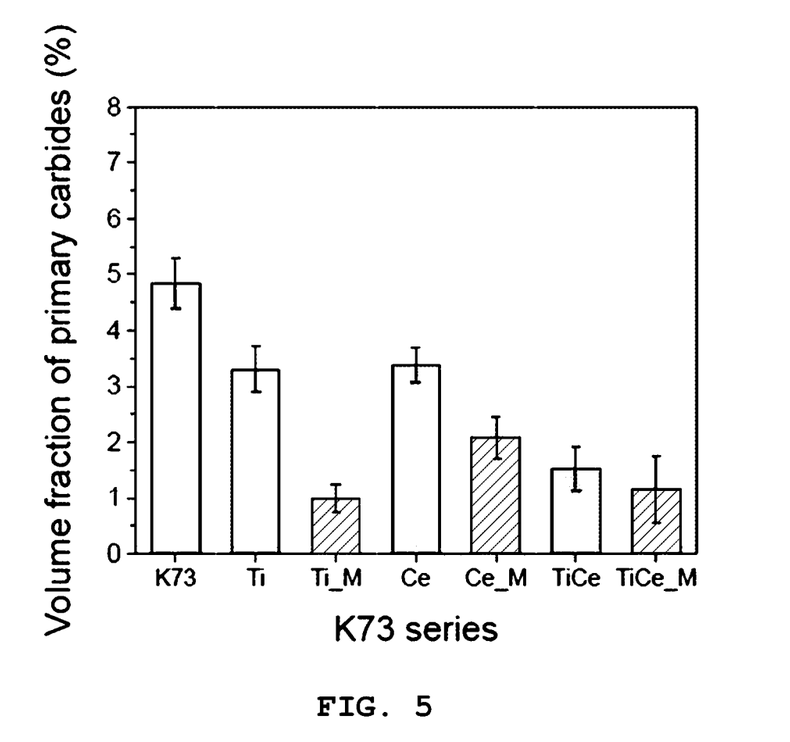
FIG. 5 is a graph showing a reduction in primary carbide volume fraction of the tool steel manufactured according to an embodiment of the present invention.
Figure 6:
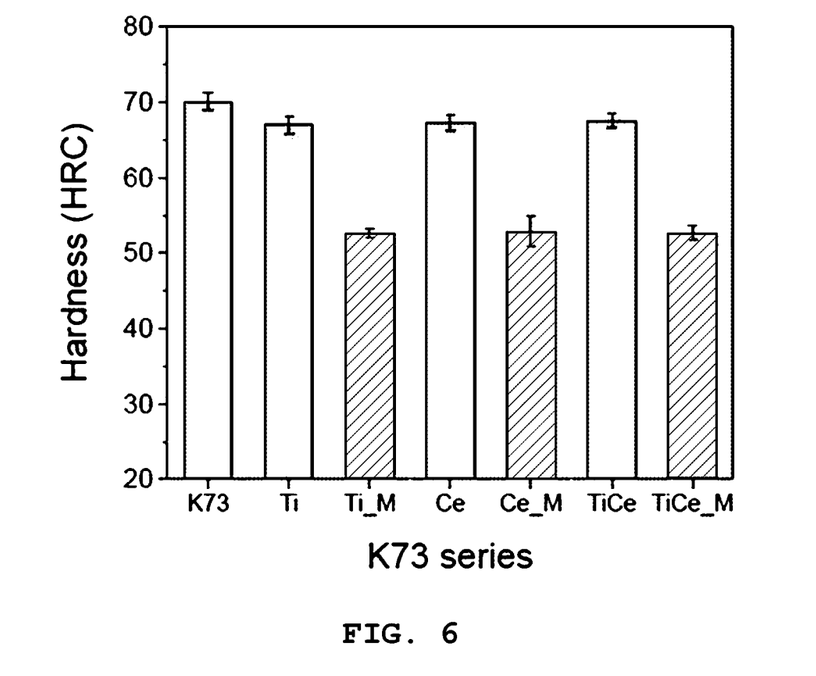
FIG. 6 is a graph showing a decrease in the hardness of a cast material due to the reduction in primary carbide volume fraction of the tool steel manufactured according to an embodiment of the present invention.

FIG. 5 is a graph showing a reduction in the primary carbide volume fraction of the tool steel manufactured according to an embodiment of the present invention, and FIG. 6 is a graph showing a decrease in the hardness of a cast material due to the reduction in primary carbide volume fraction of the tool steel manufactured according to an embodiment of the present invention.

The primary carbide volume fractions may be represented as the following relationships.

$$\text{Primary carbide volume fraction (vol \%)} = 4.90 - 99.2 \times \text{Ti content (wt \%)}$$

$$\text{Primary carbide volume fraction (vol \%)} = 4.83 - 71.0 \times \text{Ce content (wt \%)}$$

The primary carbide volume fraction may be reduced by Ti or Ce at the same hardness level, whereby impact toughness may be improved, but hardness may be decreased upon excessive addition thereof.

As described hereinbefore, the super-high-strength tool steel having high impact toughness according to the present invention contains at least one of Ti and Ce, thus reducing primary carbide content in an as-cast state and exhibiting improved impact toughness at a high hardness level after solution treatment and tempering.

Therefore, the super-high-strength tool steel having high impact toughness and the method of manufacturing the same according to the present invention may be applied to products for steel industry, automotive industry, shipbuilding industry, heavy industry and plant industry using special alloy steel or ultrahigh tensile steel sheets, and can be employed in tool materials and part materials for world-class industrial-based material processing.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tool steel having strength and impact toughness, consisting of:
   0.7 to 0.9 wt % of C;
   0.4 to 0.6 wt % of Si;
   0.4 to 0.6 wt % of Mn;
   7.0 to 9.0 wt % of Cr;
   1.5 to 2.5 wt % of Mo;
   up to 1.0 wt % or less (excluding 0 wt %) of V;
   0.01 to 0.06 wt % of Ce; and
   a remainder of Fe and inevitable impurities,
   wherein the tool steel has a hardness of 59 to 65 HRC and an impact toughness of 30 to 42 J/cm².

* * * * *